United States Patent [19]

Ross

[11] 4,077,080
[45] Mar. 7, 1978

[54] DEVICE FOR PASSING THROUGH PIPELINES

[76] Inventor: Louis Anthony Ralph Ross, 54 Llanvair Dr., South Ascot, Berkshire, England

[21] Appl. No.: 619,473

[22] Filed: Oct. 3, 1975

[30] Foreign Application Priority Data

Oct. 4, 1974 United Kingdom ............... 43231/74

[51] Int. Cl.² ............................................. F16L 55/10
[52] U.S. Cl. ............................................. 15/104.06 R
[58] Field of Search ............... 15/104.05, 104.06 R; 138/93, 97

[56] References Cited

U.S. PATENT DOCUMENTS

| 3,190,679 | 6/1965 | Lester | 138/93 X |
| 3,834,422 | 9/1974 | Larson | 138/93 X |
| 3,870,085 | 3/1975 | Schneider | 138/93 |
| 3,902,528 | 9/1975 | Tartabini et al. | 138/93 X |
| 3,908,682 | 9/1975 | Thompson | 15/104.06 X |
| 3,946,761 | 3/1976 | Thompson et al. | 138/93 X |

Primary Examiner—Christopher K. Moore
Attorney, Agent, or Firm—Cushman, Darby & Cushman

[57] ABSTRACT

A device for passing through pipelines comprises a cylindrical structure with a flexible cylindrical sleeve firmly located around the outer curved dimension of the structure, the sleeve being capable of expansion by internal fluid pressure within an annular chamber formed in part by the sleeve and having at least one fluid connection accessible at an axial end of the structure.

3 Claims, 8 Drawing Figures

DEVICE FOR PASSING THROUGH PIPELINES

BACKGROUND OF THE INVENTION

This invention relates to a device for passing through pipelines. It can take many forms, some of which are called a pipeline 'Swab' or 'pig'. Such a known device which is usually generally cylindrical in shape, but is sometimes spherical, is used for a variety of purposes in pipelines. For example, removing loose debris, diameter gauging, expelling gases or fluids, stopping off, separating different gases or fluids, etc. It can be caused to pass through a pipeline also by variety of methods, e.g. by towing, by gas or fluid pressure in the pipeline, or it may be self-propelled. The device according to the invention can also be used for these and other purposes, and can be moved by the same methods.

Known devices suffer from a number od defects and difficulties. It is often difficult to insert them in and remove them from a pipeline, since they must of necessity be of a diameter close to or slightly greater than that of the pipeline. They do not always form a perfect seal in the pipeline if the latter includes substantial variations of internal diameter. In order to ensure a seal, the swab or pig must have a frictional contact with the wall of the pipeline, but the better the seal the greater the difficulty of propelling the device, and the greater the difficulty of insertion without special means attached to the end of the pipeline.

SUMMARY OF THE INVENTION

The device according to this invention, aims at providing means by which pipelines may be swabbed without the drawbacks experienced in the use of either pigs or spheres as already known.

Accordingly, the invention provides a cylindrical structure around the outer curved dimension of which is firmly located a flexible cylindrical sleeve capable of expansion by internal fluid pressure within an annular chamber of which one wall is formed by said sleeve, said chamber having at least one fluid connection accessible at an axial end of said structure.

In preferred forms, two fluid connections are provided, one being accessible from each axial end of said structure.

Normally, the axial length of the device should not be less than its diameter. Deflated, the device, which may be made for use in any size of pipeline, would have a diamter less than the internal diameter of the pipeline in which it was to be used. Having a smaller diameter than the pipeline, no difficulty would be experienced in placing it in the pipeline or removing it.

BRIEF DESCRIPTION OF THE DRAWINGS

In order that the invention may more easily be understood, reference is now made to the accompanying drawings in which.

DESCRIPTION OF THE PREFERRED EMBODIMENTS

Figure 1:
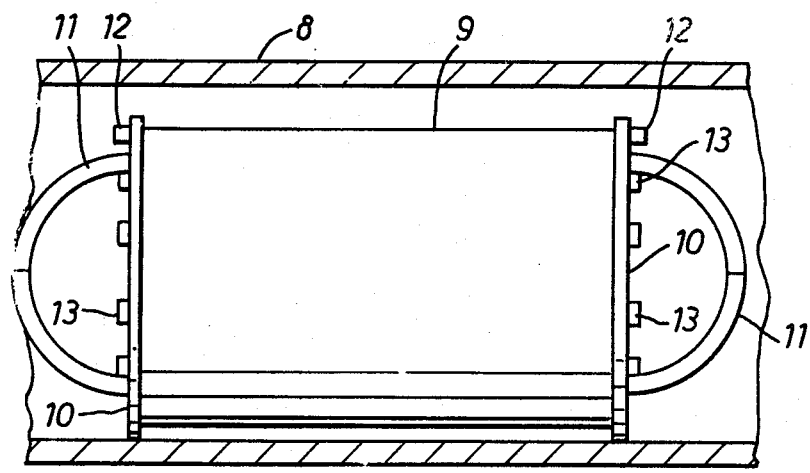
FIG. 1 shows a side view of the device, uninflated, in a short longitudinal section of pipe.

In FIG. 1, a device according to this invention, in the form of an inflatable swab, is shown uninflated in a pipe 8, its weight being carried by its end closure flanges 10 which are secured by bolts 13. Lifting handles 11 are attached by welding to the closure flanges 10. The lifting handles 11 serve not only for carrying the device and facilitating its entry into a pipe but assits in guiding the swab around bends in pipes during axial movement. The closure flanges 10 locate the inflatable jacket 9 and being of slightly greater diameter than the jacket 9, the device rests on the flanges and not on the jacket. Sealing caps 12 protect inflation valves at each end of the device which are connectable to alternative fluid supply pipelines whereby the device may be operated in either direction through the pipeline.

Figure 2:
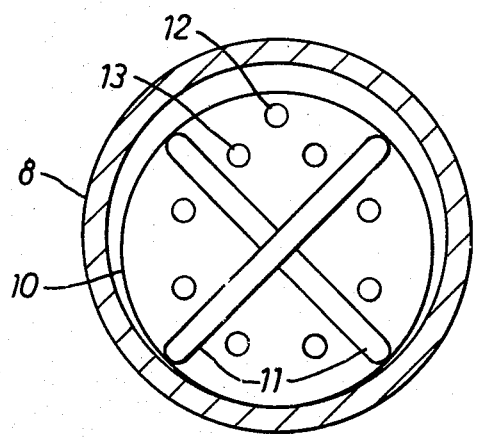
FIG. 2 shows an end view of the device.

An end view of the swab is shown in FIG. 2. The numbers of securing bolts 13 and lifting handles 11 required would be dependent on the size of pipe in which the device was to be used.

The space shown between the uninflated swab and the pipe wall 8 as depicted in FIGS. 1 and 2 is diagrammatic; the device would be manufactured with a diameter of between 90% and 95% of the bore of the pipe in which it is to be used.

Figure 3:
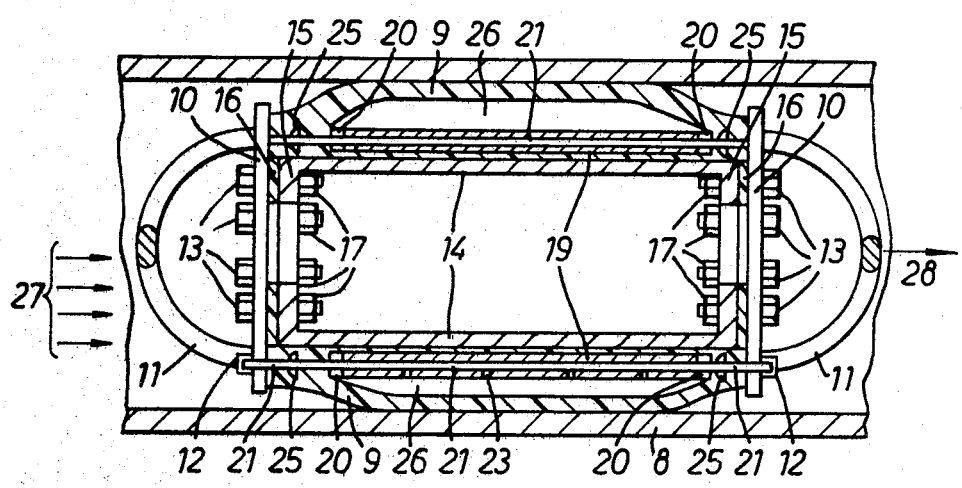
FIG. 3 shows the device in axial cross-section in inflated condition.
Figure 4:
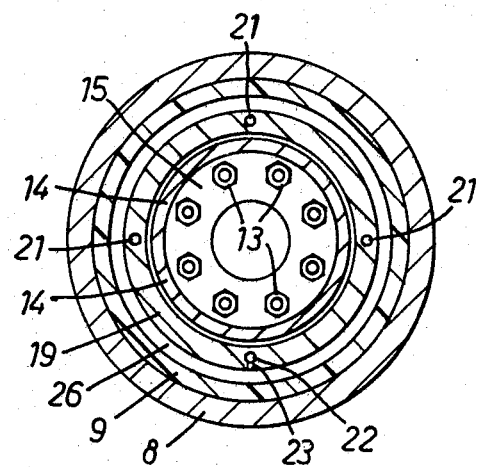
FIG. 4 shows a central cross-section of the device as shown in FIG. 3.

FIGS. 3 and 4 depict cross-sectional views of the swab, the former along the major axis and the latter at right angles to the axis at a mid-way section.

Both Figures show the swab in an inflated condition, the expandable, double-walled, plastic jacket 9 being deformed radially outwards by inflation of a chamber 26 within the jacket by fluid under pressure to bring it into frictional contact with the pipe 8.

The jacket 9 fits over a metallic or hard plastic, central, cylindrical core 14 which is provided with end flanges 15 through which the bolts 13 secure the closure flanges 10 by means of locking nuts 17 welded or otherwise fixed, to the end flanges 15. The void in the central core 14, is sealed by joint rings 16.

Inflation or deflation of the chamber 26 is effected by air or other fluid via 'Schrader'or similar type valves 24 situated at each end of the device, and through a hollow rod 22 having outlet holes 23 along its length. Total encapsulation of the valves 24 is accomplished during manufacture of the jacket. Anchorage flanges 25 locate the valves 24 and link rods 21 and prevent axial movement through the plastic surrounding them due to forces applied through the plastic during operation of the swab.

The hollow rod 22 and the link rods 21 pass through metallic end rings 20 to which they are secured by welding or other means.

The link rods 21 and hollow rod 22 are imbedded in a cylindrical spacer 19 which has previously been cast around them. The cylindrical spacer can be made from a synthetic rubber or similar material selected not only for its capacity to withstand the high temperatures likely during the casting of the plastic inflatable jacket 9, but also for its ability to withstand surface bonding to any material cast around it. Several known cold curing synthetic rubber compounds are available for this purpose.

The cylindrical spacer 19, as previously stated, serves the purpose of providing a means by which the inner and outer walls of the jacket 9 may be kept apart.

A hollow or void may be created however at the time of manufacture by making a cylindrical spacer of a low-melting point metal. By casting a cylindrical shape in such low-melting point metal (the selection of a metal whose melting point is greater than that to which it would be subjected during encapsulation casting of the plastic inflatable jacket being essential) a hollow cavity may be created in the encapsulating plastic jacket by heating the jacket to a temperature which will melt the metal cylinder it surrounds. The molten metal may then be removed from the interior of the plastic jacket by pouring via the hollow tube or rod 22.

Prior to entry into a pipeline, the valve at the leading end of the device would be closed. Following entry, a connection would be made between the valve at the rear of the device and an air or water pump. By actuation of the pump the device would be inflated in the pipeline to effect both a desired degree of surface contact and of resistance to movement between it and the pipe. When expanded, the longitudinal elevation of the device would assume a shape approximating to that of a traditional wooden barrel excepting the zone of contact area with the pipe wall which would naturally be flat. The device would assume a shape conforming to and intimately fitting the bore of the pipe. By virtue of the flexibility of its plastic jacket and the resilience and malleability thereof induced by inflation, the unit may be propelled by fluid pressure in a pipeline in a similar manner to that of a pig or a sphere and perform identical functions to those units in use in a pipeline, as is already well known to those skilled in the art.

In being inflated, and made of flexible material, the jacket of the device may be temporarily but easily deformed to conform to variations in diameter or to the inequality of section of a pipeline during its propulsion therethrough. Also, as the material of constructions of the jacket, forming an intergral part of the device, would be of a resilient nature, the temporary deformation incurred under such circumstances as described, would readily be assimilated by the inflated zone. A small increase in internal pressure in the expandable jacket coupled with an increase in the force between the jacket and the wall of the pipe would occur under such circumstances.

The front of the device may be fitted with a gauging plate for pipeline diameter definition if required. The device may also be fitted with brushes and/or scraper blades for the removal of deposits from pipe walls during exial progress.

When propelled by a pressurised liquid the device may be fitted with small bore tubes to convey or by-pass liquid from the rear of the device to its front end, the direction of the ends of the fluid by-passing tubes being orientated to discharge the fluid at the pipe walls in a trangetial manner to effect dislodgement of soft pipe wall deposits ahead of the travelling unit.

Radio wave or magnetic field emission signalling equipment may be attached to the device for use in 'tracking' or locating the position of the device during its progress throughout a buried pipeline. Similarly tracking of the device may be effected by equipping it with a radioactive source.

On arrival at the reception end of a pipeline run, and, following the removal of the propelling fluid from the line, by drainage or venting pipework, the device may be removed from the line simply by deflation of the expanded hollow cylinder via the valve situated at the front of the unit.

Water may be used for initial filling of the device and compressed air injected subsequently for inflation. As water is not readily compressible, the subsequent injection of air would effect rapid expansion of the unit as desired and create the necessary 'cushion' effect required for easy deformation of the unit as and when such need arises as, for instance, if the pipebore was slightly smaller. Initial water filling may readily be achieved by introducing water into the cylinder of jacket through the lower valve whilst the unit is held with its major axis in a vertical plane. Air would then be vented via the upper valve until the unit was filled. An anti-freezing fluid may be added to prevent inadvertent damage by frost.

The preferred type of material from which the hollow cylinder would be made would be selected from that range of plastics which has physical characteristics ranging between natural rubber and solid synthetic materials. One suitable material is polyurethane which has high surface wearing properties coupled with the necessary flexibility and resilience required for the function envisaged.

Figure 5:
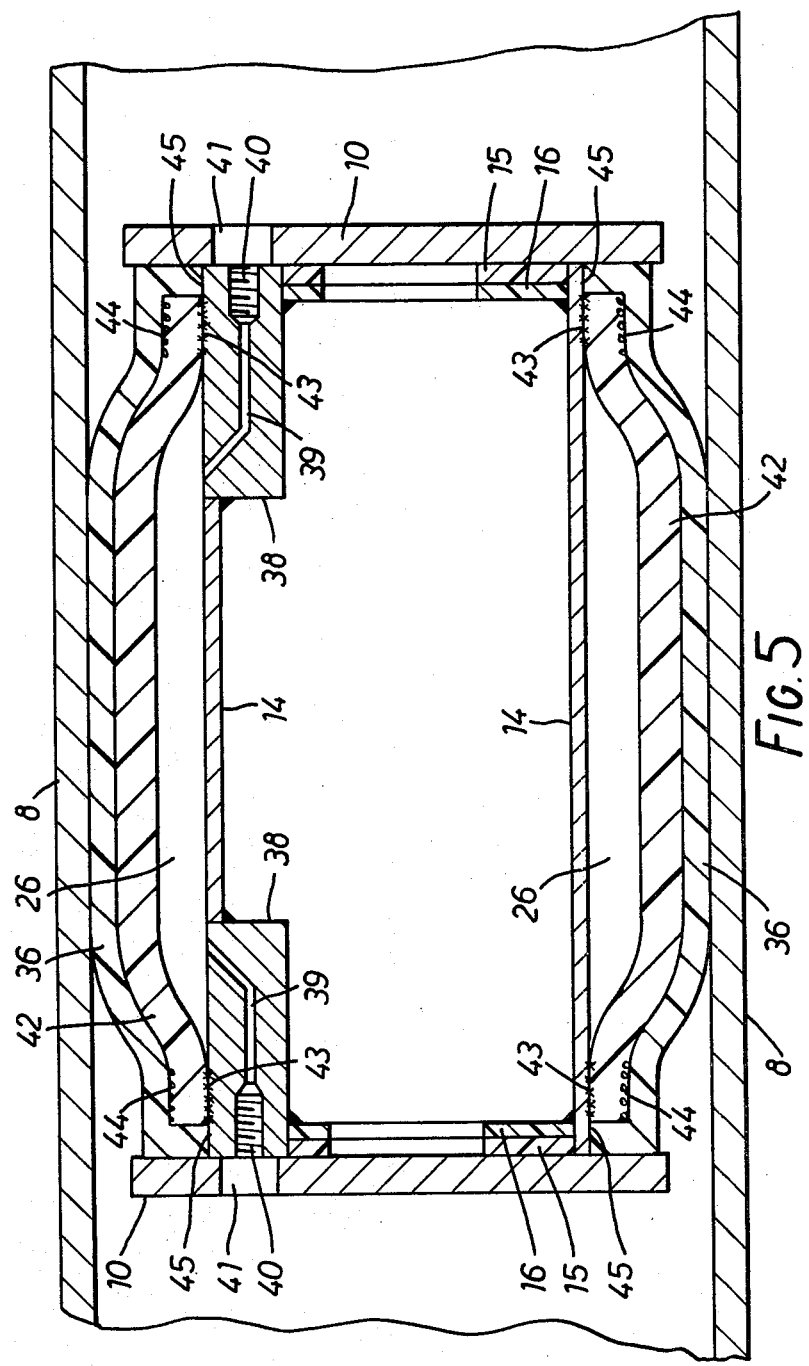
FIG. 5 shows an axial cross-section of the device constructed in a different manner.

FIG. 5 shows an axial cross-section of a modified device according to the invention in expanded condition inside a pipe 8. In this case, a metallic or plastic central core 14 is surrounded by a high temperature resistant cylindrical rubber sleeve 42, bonded at its ends 43 by vulcanising to the central core 14. High tensile wire rovings or band reinforcement 44 further secures the rubber sleeve 42 to the core.

After fixing, the rubber sleeve 42 is cylindrically encased by a cover 36 of high abrasion resistant polyurethane or a similar flexible plastic material, bonded to the core 14 at zones 45.

The annular space 26 between the rubber sleeve 42 and the core 14 may be inflated or deflated by fluid injected or released via access holes 41 and ducts 39 drilled through blocks 38 affixed internally to each end of the cylindrical core 14. In this construction, the need for a cylindrical spacer embedded in the sleeve is eliminated.

Figure 6:
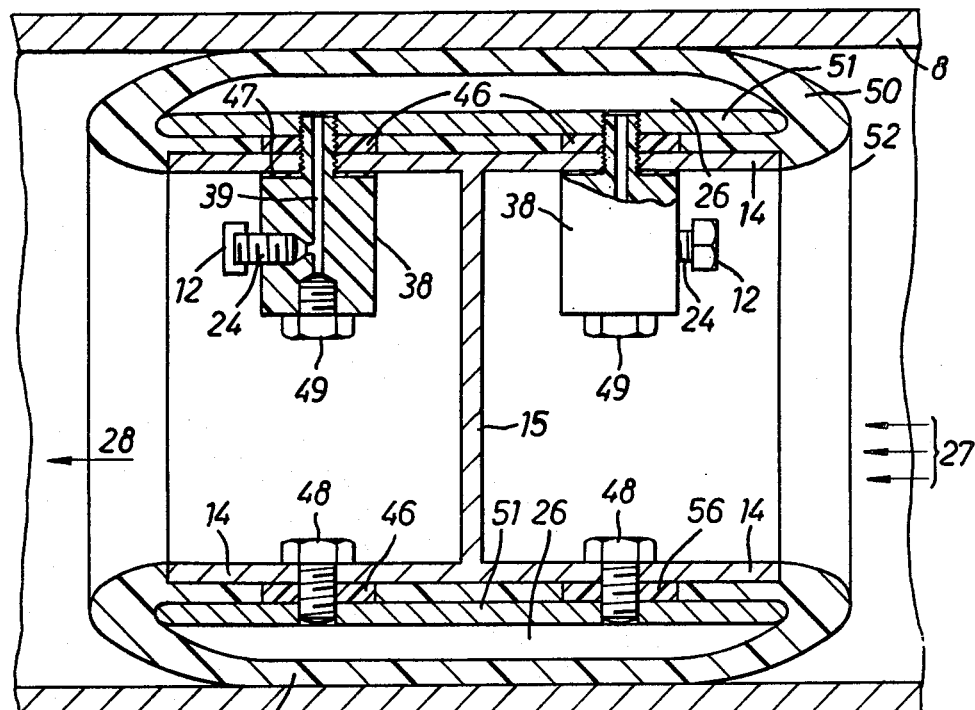
FIG. 6 depicts in longitudinal cross-section another form of the invention inflated in position in a pipe.

In FIG. 6, a cross-section of a further modified device of preferred form is depicted. It is shown in expanded contact with the internal walls of a pipe 8.

A cylindrical metallic core 14 has a central circular plate 15 to receive the propelling force on the swab applied by pressurised fluid flow indicated by arrows 27.

The core 14 is surrounded by an inflatable cylindrical jacket 9. This is again a double-walled structure 50 which encapsulates a rigid cylindrical member 51, leaving an inflation chamber 26 between the outer wall and the outer surface of member 51. The structure 50 can be manufactured by casting, said outer surface of member 51 being previously coated with a non-bonding agent. The ends 52 of structure 50 are shaped to provide buffers or cushions.

The member 51 is spaced concentrically around the inner core 14 by washers or spacers 46 and held to it by screws 48 and valve blocks 38. The valve blocks 38 are provided with 'Schrader' or similar type valves 24. Caps 12 to the valves 24 protect the valve ends.

Fluid injected via the valves 24 and the fluid passageway 39 forces the outer wall of the structure 50 radially outwards.

The material of the structure 50 completely fills the annular space between the two cylinders 14 and 51 and encapsulates and hence seals the spacing washers 46. This sealing effect may be enhanced by coating the inner surface of the cylindrical members 51 and the outer surface of the cylindrical core 14 with a bonding agent prior to assembly. Sealing-off potential escape routes of pressurising fluid is further improved by attaching the valve blocks 38 through the wall of the inner cylinder 14 to and through the walls of the member 51 prior to moulding.

Attachments as previously described such as a gauging plate, brushes, detecting equipment etc. may be made by affixing studs, or sockets to the inner wall of the two ends of the cylindrical core 14. The central flange or plate 15 may be pierced to take by-pass tubes as described.

Inflated with its outer surface in sealing contact with the interior of a pipeline the device described in this invention may be propelled axially in either direction in the pipeline by fluid pressure applied to it. Relaxation of the internally applied radial sealing contact may be accomplished by actuation of a valve to release the internal inflating pressure on the accessible face of the device on the completion of its journey through a pipeline.

Figure 7:
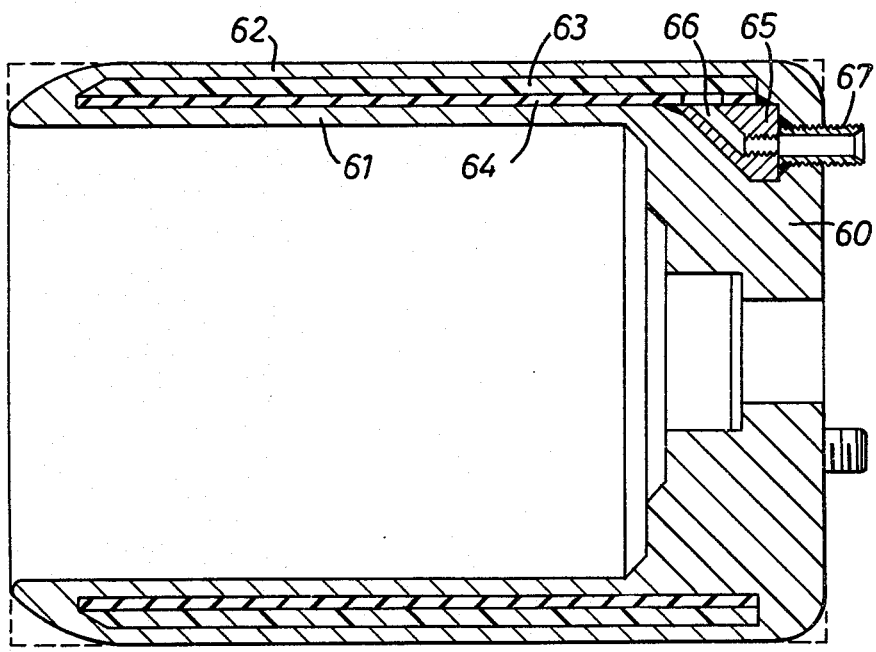
FIG. 7 shows an axial cross-section of a device suitable for fitting over a motor housing.

A novel use may be made of the inflatable swab or pig whereby, in lieu of a swab being fitted with a cylindrical core, the inflatable jacket of a swab may be made dimensionally suitable to slide over the cylindrical body of an air-driven motor or an electirc motor, the internal diameter of the inflatable jacket of the swab in a deflated state being such that it would just slide over the cylindrical body of a motor. Such a device is shown in FIG. 7.

The device shown has the shape of a hollow cylinder open at one end. The relatively massive end wall 60 is shaped internally to conform with the external shape of an air motor. The wall 60 is integrally moulded with internal and external cylindrical walls 61,62, from a semi-rigid plastic material, so that the whole is self-supporting. Between the walls 61,62, are included a flexible cylindrical jacket 63 and a thin rubber sleeve 64. A solid block 65 has a passage 66 leading from a fluid connector 67 to the interface of the jacket 63 and the sleeve 64. When pressure fluid is applied to connector 67, the jacket 63 expands outwards with the external wall 62.

If the motor is equipped with rotable flails, scrapers, brushes or other devices commonly employed for the internal cleaning of pipes or ducts, the inflatable jacket may be used when affixed around and to such a motor as an anti-torque device. With the whole assembly inserted in a pipe, the surrounding jacket may be inflated to grip the walls of the pipe and in so doing prevent rotation of the motor when the latter is actuated by compressed air or a source of electric power in order to rotate the flails or other cleaning devices as described.

The invention may also be used for the internal pressure testing of joints in a pipeline either by the provision of annular space midway along the body of an inflatable unit (thus effectively dividing a unit into two cylindrical expanding units) or by coupling two inflatable swabs axially together. In either way, an annular space located between two inflatable swabs may be created and inserted internally through a pipe to a joint position, the annular space being located coincident with the zone of the joint. By external means, as previously described, both jackets may then be expanded into forceful sealing contact with the internal surface of the pipe either side of the joint, and fluid injected into the space between the two jackets.

To accomplish isolation of a section of a pipeline it would be necessary to instal at each of the boundaries of the section, moveable pins each of which would be inserted through previously provided welded and flanged connections located on the wall of the pipeline and at right angles to it in a, preferably, vertical plane. This procedure is already standard practice. By suitable piston-like mechanism, each pin may be moved across the internal diameter of the pipe presenting substantial barriers to the progress of a body, such as an inflatable swab, moving in and with the fluid flow contained in the pipeline.

If an axially central and horizontally forward projecting metal probe were to be fitted to the front end of an inflatable swab, the jacket of which being linked by a suitable fluid passage with the tip of the probe, compressed air or other suitably pressurised fluid may be injected into the jacket of the swab effecting expansion of the device as before described.

The pressurized injection of a fluid for this purpose from a source external to a pipeline may be provided via a moveable pin located in a pipeline by providing the central face of the pin with a conically shaped opening into which the probe fitted to a moving inflatable swab would enter during the propelled progress through the pipeline of the swab. The conical shape of the opening would effect a 'wedging' and centralising action on the probe, the tip of which would thence be guided to a small central aperture at the base of the conical opening. A jointing seal would be affixed around the central aperture.

Maintaining the pressure thus internally applied to the inflatable swab as described, the device may be used as an effective pipeline sealing stopper.

It follows and will be observed that two such inflatable swabs propelled through a pipeline may be halted one after the other and inflated to become pipeline sealing stoppers at each end of a section of pipeline on which it is desired to carry out work.

On completion of the necessary work to the pipeline, the internal pressure previously applied to the inflatable swabs used as stoppers may be relaxed and the pins withdrawn from the pipeline permitting the propulsion of the swabs to occur in order that they may travel on through the pipeline to a suitable withdrawal point.

If it were feared that the frictional engagement between the swab and the pipeline would not be sufficient to hold it in position against the fluid forces in the pipeline, a mechanical locking can be provided. For example, two forked arms can be fitted to the forward end of the swab so as to locate against the pin which projects across the pipeline. Means can then be arranged to lock across the forks to prevent the swab moving backwards.

Figure 8:
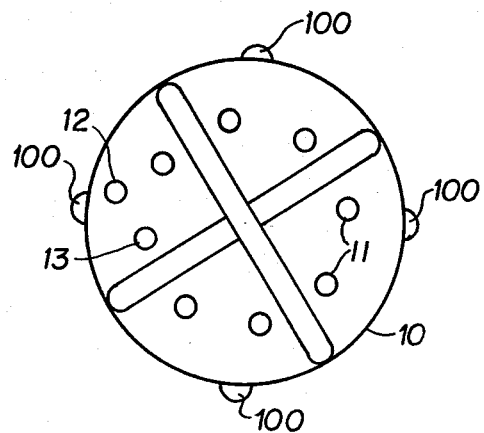
FIG. 8 shows a sectional end view showing longitudinally extending ribs on a device which is otherwise the same as FIG. 2.

All the embodiments described are susceptible of further modification as follows:

a. The outside of the inflatable jacket can be provided with an easily replaceable wearing surface, e.g. one or two solid rubber or plastic tyres. These, and not the jacket itself, would then contact the pipeline walls.

b. When the device is not to be used for sealing a pipeline, but only as an anti-torque device, the outside of the jacket can have radially projecting, longitudinally extending ribs e.g. three or four ribs 100 as shown in sectional FIG. 8. These ensure frictional engagement with the walls, but leave spaces between so that the swab can pass internal projections in the pipeline.

c. The device may carry a source of compressed gas e.g. a nitrogen bottle. Suitable valves and remote control equipment can then be used to stop the device, and to release it again, at any point in a pipeline.

It will be understood that the above description of the present invention is susceptible to various modification changes and adaptations.

What is claimed is:

1. A device for passing through a pipeline comprising a cylindrical structure with open ends and a dividing wall extending across the cylindrical space within it at a point between said ends; a flexible cylindrical sleeve located firmaly around an outer curved surface of the structure, the sleeve defining a closed annular chamber which is capable of expansion by internal fluid pressure; and two fluid connections to said chamber, positioned one on each side of said dividing wall and accessible one from each end of the structure; said fluid connections being connectible to alternative fluid supply pipelines whereby the device may be operated optionally in either direction through a pipeline.

2. A device for passing through a pipeline comprising a cylindrical structure having a flexible cylindrical sleeve located firmly around an outer curved surface of the structure, the sleeve defining a closed annular chamber which is capable of expansion by internal fluid pressure; and two fluid connections to said chamber, positioned one on each axial end of the structure, each fluid connection including a valve whereby fluid is retained in or released from said annular chamber; either connection being connectible to a fluid supply pipeline while the other valve is closed.

3. A device for passing through a pipeline comprising a cylindrical structure having a flexible cylindrical sleeve located firmly around an outer curved surface of the structure, the sleeve defining a closed annular chamber which is capable of expansion by internal fluid pressure, said chamber having at least one fluid connection accessible at an axial end of said structure; and said sleeve having exteriorly a number of radially projecting ribs which extend parallel to each other and to the longitudinal axis of the cylindrical structure; whereby said ribs act as effective torque-resisting elements when said sleeve is expanded into contact with the internal wall of a pipeline and said device is operating as an anti-torque element.

* * * * *